Jan. 24, 1961  P. S. WEBSTER  2,969,051
VARIABLE CAM TIMING MECHANISM
Filed Oct. 16, 1959  3 Sheets-Sheet 1

INVENTOR.
PHILIP S. WEBSTER
BY John W. Michael
ATTORNEY

Jan. 24, 1961 P. S. WEBSTER 2,969,051
VARIABLE CAM TIMING MECHANISM
Filed Oct. 16, 1959 3 Sheets-Sheet 2

INVENTOR.
PHILIP S. WEBSTER
BY John W. Michael
ATTORNEY

INVENTOR.
PHILIP S. WEBSTER
BY John W. Michael
ATTORNEY

… …

United States Patent Office 2,969,051
Patented Jan. 24, 1961

2,969,051

VARIABLE CAM TIMING MECHANISM

Philip S. Webster, 122 Headlands Road, Painesville, Ohio

Filed Oct. 16, 1959, Ser. No. 846,925

16 Claims. (Cl. 123—90)

This invention relates to valve operating mechanism for a four cycle engine which automatically adjusts the timing of the opening and closing of the valves responsive to changes in engine speed to obtain maximum power for all speeds.

Conventional engines have a fixed cam timing which varies only from engine to engine according to specification and manufacture's requirements. This fixed cam timing results in maximum torque only for a small range of engine speeds. For example, racing car engines have a fixed cam timing 20–15—60–55 for a maximum torque between 3000 to 6000 r.p.m. For speeds between 2200 to 2600 r.p.m. a fixed cam timing of 5–5—50–50 produces maximum torque. This fixed cam timing is based on degrees of rotation of the crankshaft with respect to top dead center (TDC) and bottom dead center (BDC). The first number expresses the degrees before TDC that the intake valve opens. The second number expresses the degrees after TDC that the exhaust valve closes. The third number expresses the degrees after BDC that the intake valve closes. The fourth number expresses the degrees before BDC that the exhaust valve opens. By adding the 1st and 3rd numbers to 180° the intake period or duration in degrees is determined. By adding the 2nd and 4th numbers to 180° the exhaust period or duration in degrees is determined. Thus for maximum torque, i.e. maximum charging, at higher speeds the greater must be the intake period in degrees to offset the decrease in time that the valve is open and to fully utilize the kinetic energy of the incoming mixture. In an internal combustion engine at speeds over 2400 r.p.m. an intake and exhaust period of about 320° produces a maximum torque, and at speeds under 2400 r.p.m. an intake and exhaust period of 240° produces maximum torque.

Therefore, an object of this invention is to provide automatic means for varying cam timing so that optimum engine performance is possible at all engine speeds.

Another object is to provide such means which can be inexpensively incorporated in conventional engines.

A further object is to provide such means the automatic feature of which can be selectively regulated to meet special conditions of engine usage.

These objects are accomplished by providing a camshaft which is adjustably movable with respect to the valve tappets and which has tapered cam lobes which change the cam timing or valve opening and closing with respect to the degrees of crankshaft rotation from dead center when the camshaft is moved relative to the tappets. The cam lobes are made movable by utilizing a two-piece camshaft which consists of a driving end axially fixed and connected to the crankshaft by conventional means and a cam lobe carrying part which has its outer end journaled in a bearing for limited axial movement. The driving end and cam lobe carrying part are interconnected by a spline for transmitting rotative movement while permitting relative axial movement. The bearing for the cam lobe carrying part opens into a cap which covers the main bearing oil gallery. A spring operative between the two pieces of the camshaft continually urges the cam lobe carrying part toward the cap. When engine speed increases, oil gallery pressure is increased to force the cam lobe carrying part toward the driving end part and slide the larger part of the tapered cam lobes into operative contact with the valve tappets to increase the intake and exhaust periods. When engine speed decreases the oil pressure is decreased and the spring forces the cam lobe carrying part away from the driving end to slide the smaller part of the tapered cam lobes into operative contact with the valve tappets to decrease the intake and exhaust periods.

The abovementioned camshaft can be mounted in a conventional engine with only slight modification of the camshaft mounting structure. The tappets are taper ground to provide line contact with the cam lobes. The only special production equipment required is a tapered grinding wheel to grind the tapered cam lobes. It is readily apparent that the slight increase in cost of the present construction is more than offset by the improved performance secured from the engine.

The degree of automatic operation is selectively determined by a plurality of spaced outlets in the bearing for the cam lobe carrying part which are selectively opened by a manually controlled plunger to bleed off the pressure in the cap when the end of such part uncovers an open outlet. Thus the increase of intake and exhaust period can be stopped even if engine speed continues to increase.

The invention will be readily understood by reference to the following description and accompanying drawings which illustrate a valve operating mechanism, as applied to a four cycle internal combustion engine with the camshaft parallel to the crankshaft and in which.

Only so much of the engine block as is necessary for a complete understanding of the invention, and only the valve tappet operating mechanism for one cylinder is shown and described. All auxiliary drives are removed to simplify the explanation of this invention.

Figure 3:
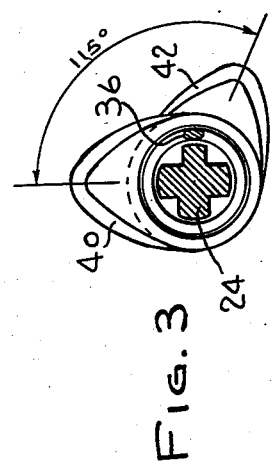
Fig. 3 is a fragmentary sectional view taken on line 3—3 of Fig. 1.

Referring to the drawings, a two-piece camshaft 10 is rotatably mounted in a front main bearing 12 in the front wall 13 of an engine block and in a rear main bearing 14 positioned in the rear wall 15 of the engine block. The two-piece camshaft has a driving end or front part 16 and a cam lobe carrying part 18. The front part 16 is fixed against axial movement outwardly of the block by a conventional thrust plate 17 secured to the face of the block. Its outer end has a positive conventional driving connection to the crankshaft (ratio 2:1). This may be a gear 22 as shown or a conventional chain and sprocket. The front part 16 has a splined shaft 24 which projects rearwardly into a grooved recess 26 in the front end of the part 18. This arrangement, which may be inverted, permits the part 18 to have relative axial movement with respect to the driving end while providing positive angular drive. As shown in Fig. 3, one of the splines and one of the grooves are smaller in section than the others so that two parts of the shaft can only be assembled in one relative angular position.

The cam lobe portion 18 has a journal 20 which is rotatably and slidably mounted in the rear main bearing 14. Since the journal 20 forms the ram of a hydraulic press of which the rear main bearing 14 is the cylinder, the diameters of such bearing and journal will vary with different engine sizes, number of cylinders and pressures developed by conventional oil pumps. Hence the bearing 14 is mounted in a boss 21 formed as an integral part of a bearing cap 33. This boss may have a standardized outer diameter to fit in an opening in the wall of the cylinder block and the inside diameter may be varied to meet requirements. The bearing cap 33 has an internal chamber 32 which communicates with the outer end of the main bearing-cylinder 14 and over-lies the rear end of the oil gallery 35 for the main camshaft bearings. Oil passages 37 and 11 of usual design lead from the oil gallery 35 to the bearings 12 and 14 and other main bearings of a camshaft serving a multiplicity of cylinders.

Oil under pressure is supplied to the oil gallery by a conventional oil pump driven from the camshaft in the customary manner so that its speed and consequent oil pressure increase with engine speed as hereinafter explained.

The two parts of the camshaft are urged axially relatively apart by a coiled compression spring 36. It may be necessary to meet space limitations to provide counterbores 39 and 41 in the opposed ends of the two parts to accommodate such spring. The spring is strong enough to force the journal-ram 20 to its outermost position against a thrust boss 34 when the engine is not running or when the engine is running and the oil pressure is below that occurring at engine speeds below 400 to 600 r.p.m. Oil pressure in the gallery 35 acts on the face 38 of the journal-ram to move the cam lobe portion 18 forward to the limit set. The full forward movement may be limited by the engagement between the end of spline shaft 24 and the bottom of the grooved recess 26. It is advisable to meter the oil from the gallery 35 into the chamber 32 through an orifice plug 53. The reduced orifice in such plug will limit the flow of oil and retard the speed of the movement of the cam lobes to prevent a surging effect with rapid changes in engine speed.

In this illustrative embodiment the engine has a tappet 28 for lifting an exhaust valve and a tappet 30 for lifting an intake valve. Both tappets may be of the standard hydraulic type. However, it is advisable to provide the ends with a ground taper indicated at 43 to conform with the taper of the cam lobes.

The came lobe part 18 is provided with an exhaust cam 40 and intake cam 42. These cams are of conventional design except that they are ground to have an axial taper in the neighborhood of 5° to the axis of rotation. The peaks of these cams are angularly spaced a standard 115° as shown in Fig. 3. For each two complete revolutions of the engine crankshaft the camshaft will complete one revolution and the intake valve operated by the cam lobe 42 will open for the intake stroke and the exhaust valve operated by the cam lobe 40 will open for the exhaust stroke. In the position shown in Figs. 1 and 3 the exhaust valve is fully open, and the crankshaft is advanced 65° past BDC. The intake valve is closed but will start opening as the crankshaft further rotates in the exhaust stroke and reaches 25° before TDC. This is half the amount of overlap at the end of the exhaust stroke for the setting of the tapered cam lobes shown in Fig. 1. The cam timing based on crankshaft degrees in this position is 25-25—75-75 to produce an equal duration of 280°. At this same setting the intake valve closes 75° after BDC or after the end of the intake stroke. As explained hereinafter, if this results in a bad effect from reverse pumping action an additional automatic adjustment may be made.

Figure 1:
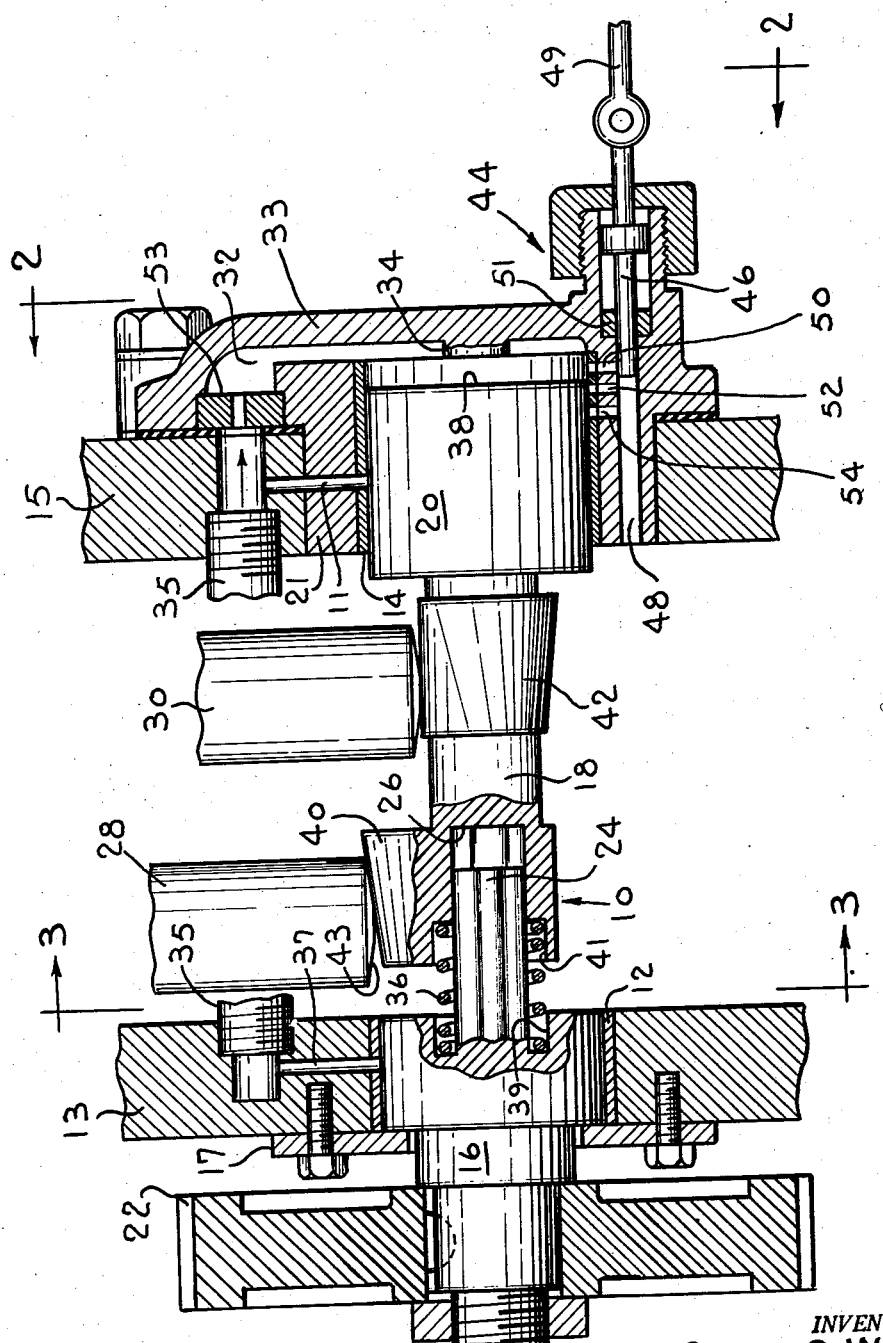
Fig. 1 is a sectional view of a valve operating mechanism embodying this invention taken on the longitudinal axis of the camshaft, except (1) for such shaft which is shown in elevation with a section broken away and (2) the right end where the section is taken on the line 1—1 of Fig. 2. This view shows only a single set of intake and exhaust valve tappets and cam lobes.
Figure 6:
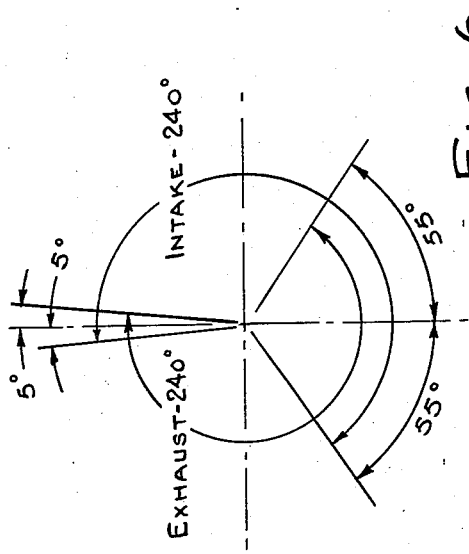
Fig. 6 is a diagrammatic view showing the cam timing (valve opening, duration and closing) in degrees of crankshaft rotation produced by the cam lobes when in the low speed position.
Figure 7:
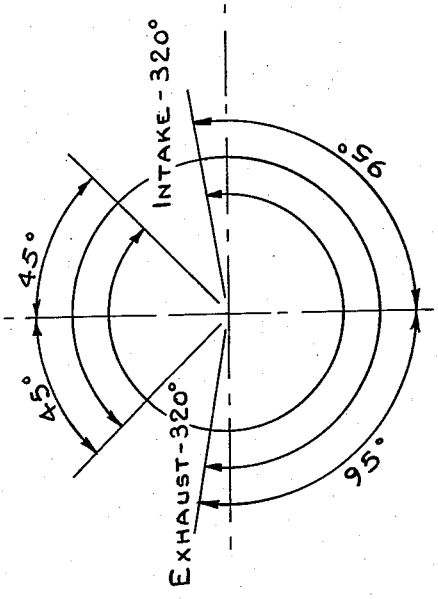
Fig. 7 is a similar diagrammatic view showing the cam timing when the cam lobe is in high speed position.
Figure 2:
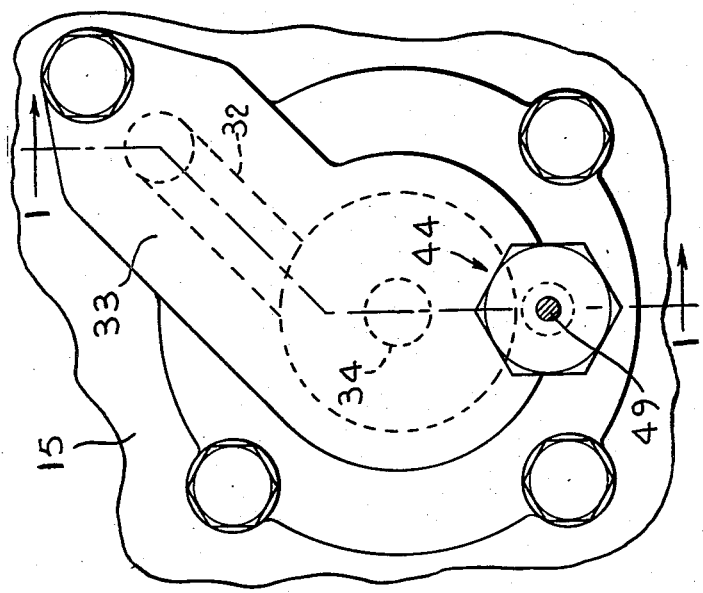
Fig. 2 is an end view taken from the line 2—2 of Fig. 1.

The cam lobe carrying part 18 in this embodiment can be moved axially about ¼ inch to either side of the position shown in Fig. 1. When in the slow speed position, e.g. moved fully to the right with face 38 abutting the boss 34, the cam timing based on crankshaft degrees will be 5-5—55-55 as is illustrated in Fig. 6. This is an equal duration of 240°. With the part 18 in the full left hand or high speed position determined by the abutment between the end of the shaft 24 and the bottom of recess 26, the cam timing will be 45-45—95-95 as illustrated in Fig. 7 to produce an equal duration of 320°.

Figure 5:
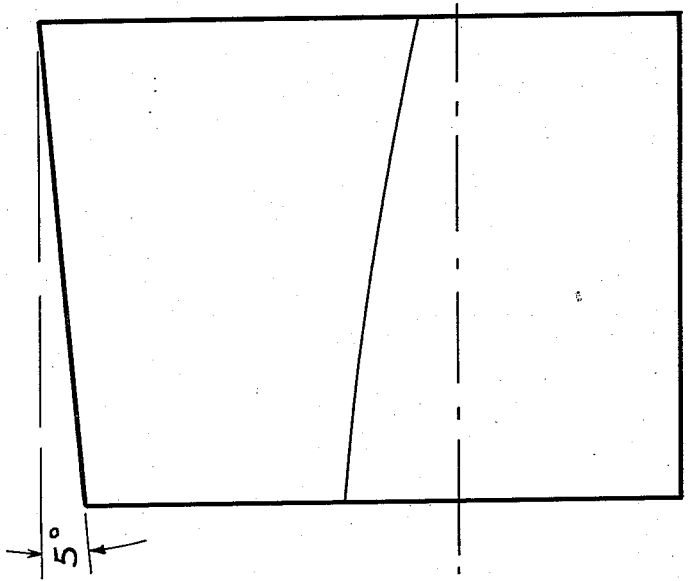
Fig. 5 is a side view of the tapered cam lobe shown in Fig. 4.
Figure 4:
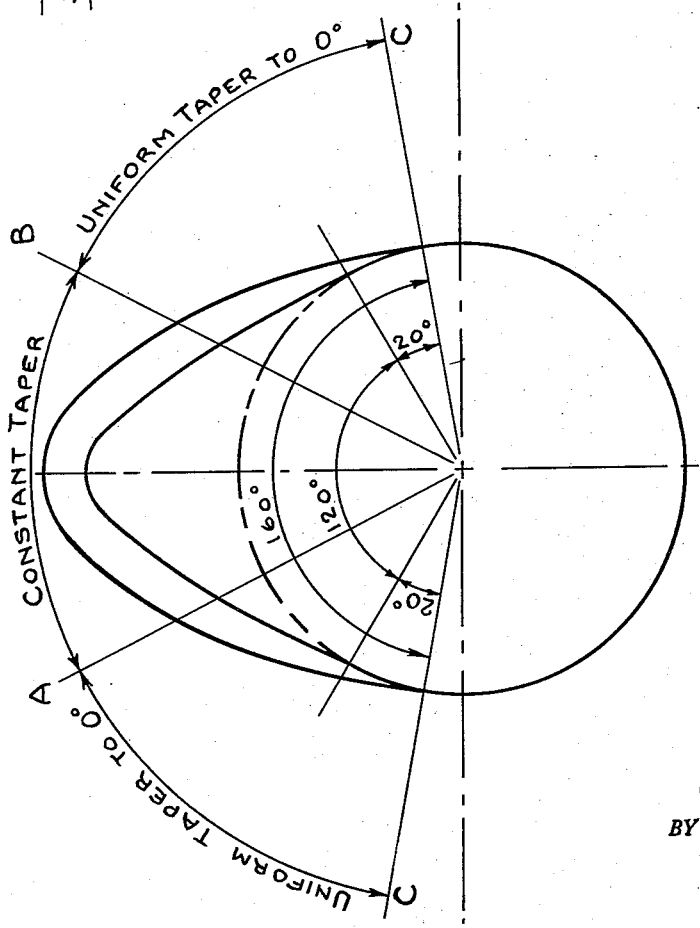
Fig. 4 is an enlarged view of a single cam lobe taken from the left end as shown in Fig. 1 and showing the angular relationships between the low speed and high speed parts of the cam lobe.

These changes in cam timing are accomplished by providing each of the cam lobes 40 and 42 with an identical taper like that shown in Figs. 4 and 5. This taper is formed by grinding the cam with a tapered grinding wheel. The taper from the large to the small end of the lobe effective to produce the cam timing changes described above is a constant 5° from the axis or rotation for the surface area included between radial lines A and B. This taper from the radial lines A and B to the radial lines C diminishes uniformly from 5° to 0°. At the small end of the lobe the left surface (surface beyond the base circle) is included within 120° camshaft or 240° crankshaft. This conforms to the dwell of Fig. 6. At the large end of the lobe the left surface is included between 160° camshaft or 320° crankshaft. This conforms to the dwell of Fig. 7.

Between these two extremes of cam timing there are a multiple of incremental positions all having the same proportional variations depending upon the position in which the cam lobe carrying part is placed by the oil pressure acting on the face 38. As the oil pressure of about 15 p.s.i. developed at 400 r.p.m. increases due to increased speed, the cam lobes will be moved from the full right or slow position toward the left, and the position shown in Fig. 1 will be reached when the oil pressure becomes approximately 30 p.s.i. at about 800 r.p.m. As speed further increases, oil pressure also increases until it reaches approximately 45 p.s.i. at about 1200 r.p.m. Since this movement to the left increases the valve dwell in crankshaft degrees as heretofore explained, the quantity of mixture induced into the cylinder during the shorter time will remain approximately constant and equal to the quantity of mixture induced during a longer time for a shorter dwell in crankshaft degrees. Thus once the proper quantity of fresh mixture for a given cylinder displacement is ascertained, the cam lobes may be ground along the lines herein set forth and a maximum torque and resulting horsepower will be obtained at all engine speeds.

For stop and go city driving a low speeed cam timing is most effective. In order to determine and limit the cam timing to lower speeds even when engine speed increases during acceleration, a limiting mechanism 44 is provided which can be adjusted to constrain the forward movement of cam lobe part 18 so that only low speed portions of the tapered cam lobes can contact the tappets. This mechanism has a plunger 46 which slides in a conduit 48 leading to the crankcase. The plunger is actuated from the automobile dashboard by suitable linkage 49. Ports 50, 52, and 54 are spaced along the conduit 48 as shown and connect the internal chamber 32 to the conduit 48 and the crankcase. When the plunger is placed in the extreme right position all the ports are open and the pressure in the chamber 34 will vent through port 50 to the crankcase and the journal-ram 20 will not be moved to the left as oil pressure increases with speed increase. However, if the plunger 46 is in the position shown in Fig. 1, the port 50 is closed and the journal-ram 20 can advance only to the position shown at which place the port 52 will vent to the crank case. When the plunger 46 is moved so as to also close port 52 the journal-arm 20 will move to the left until it uncovers port 54 and will not move further upon an increase in speed. When all the ports are closed by the plunger 46 the increase in speed will be effective throughout the entire range of movement of the journal-ram 20. No matter what the position of the plunger 46, if the oil pressure drops to around 15 p.s.i. with engine speeds at about 400 r.p.m. the journal-ram 20 will move to low cam timing under influence of the spring 36. Plunger 46 extends through oil seal 51 to prevent leakage from conduit 48.

In addition to varying the duration of cam timing by the longitudinal shifting of the tapered cam lobes as described, a further variation can be obtained by using a spiral spline (including grooves) for the straight spline on shaft 24 and spiral grooves for the straight grooves in the recess 26. Such spiral can, for example, alter the angular relation of all cam lobes with respect to the crankshaft dead center. Assume that the closing of the intake valve 75° after BDC as in the setting shown in Fig. 1 results in the inertia of the incoming fresh mixture at such speed being sufficient to offset reverse pumping action and then assume that such inertia is not sufficient to overcome the reverse pumping which takes place with the full speed setting, that is the intake valve closing at 95° after BDC. The spiral may have a pitch and turn in such a way that the ¼ inch longitudinal axial movement to the left which increases the duration in crankshaft degrees from 280° to 320° also angularly advances the cam lobes with respect to the crankshaft about 20° to maintain an intake valve closing of about 75° after BDC. As is well known in this art, the cam lobe design will be such that the acceleration and transitions will be compatible with the durations selected, the type of tappet and the engine displacement curve.

The design of the cam lobe and the automatic adjusting mechanism heretofore described is given merely by way of illustration and is not intended to limit the scope of this invention which is limited only by the scope of the appended claims.

I claim:

1. Automatic valve timing mechanism for a four cycle engine comprising, valve operating tappets, axially tapered conventional pear shaped intake and exhaust cam lobes of identical taper engageable with said tappets and shiftable with respect thereto to vary the duration period of the valve timing, and cam lobe shifting means adapted to axially shift said cam lobes according to engine speed whereby increased engine sped increases said duration.

2. The combination according to claim 1 in which said cam lobe shifting means utilizes the changes in oil pressure resulting from different engine speeds to accomplish automatic adjustment of the valve timing.

3. Automatic valve timing mechanism for a four cycle-internal combustion engine having an engine oiling system the pressure of which varies with changes in engine speed and a valve operating tappet comprising, a rotating camshaft having a conventional pear shaped cam lobe axially tapering from a large end to a small end, the peaks at said ends being axially aligned, said tappet having operating contact with a portion of the axial length of said cam lobe, said shaft having limited axial movement to shift said operating contact along the surface of said cam lobe from end to end, and means connecting said oiling system to one end of said camshaft to axially shift said camshaft under influence of changes in said pressure.

4. The combination according to claim 3 in which said tapered cam lobe is mounted so that the small end thereof contacts said tappet when said oil pressure is low.

5. The combination according to claim 3 in which there are resilient means for moving said camshaft and lobe so that the small end thereof is moved into contact with said tappet as said oil pressure decreases.

6. The combination according to claim 3 in which said camshaft has a front driving end fixed against axial movement, and a cam lobe portion provided with a journal forming a ram, said cam lobe portion having axial movement relative to said front driving end.

7. The combination according to claim 6 in which a splined shaft and grooved recess form a driving interconnection between said driving end and cam lobe portion.

8. The combination according to claim 7 in which said resilient means consists of a compression spring mounted on said splined shaft and acting between said driving end and cam lobe portion.

9. The combination according to claim 8 in which the spline on said spline shaft and the grooves in said recess have a slight spiral to angularly relatively move said driving end and said cam lobe portion upon relative axial movement thereof.

10. Mechanism for varying valve timing comprising, a two-piece camshaft including a front piece fixed for in-place rotation, and a rear piece rotatable with and slidable on said front piece, axially tapered conventional pear shaped intake and exhaust cam lobes of identical taper mounted on said rear piece so that the duration of valve timing including both valve opening and closing is altered by the sliding of said rear piece with respect to said front piece.

11. The combination according to claim 10 including a compressed spring between said front and rear pieces, and a journal ram on said rear piece adapted to be subjected to oil pressure.

12. Automatic valve timing mechanism for a four cycle-internal combustion engine having an engine oiling system the pressure of which varies with changes in engine speed, an internal chamber connected to said oiling system and intake and exhaust valve operating tappets comprising, a two part rotating camshaft having a driving end journaled and fixed against axial movement and a cam lobe portion provided with a journal the outer end of which is open to said chamber, a splined shaft and grooved recess interconnecting said driving end and cam lobe portion to transmit rotation therebetween while permitting limited relative axial movement, an intake and an exhaust conventional pear shaped cam lobe on said cam lobe portion each having an identical axial taper on the lift and lowering portions thereof extending from the large end to the small end of said lobes, said tappets having operating contact with a portion only of the axial length of such portions of said cam lobes, said small end of said lobes being more remote from said journal than the large end thereof, spring means on said splined shaft urging said journal toward said chamber to cause said operating contact to be at the small end of said cam lobes, the pressure of said oiling system in said chamber acting on said journal to move said cam lobe portion axially against said spring to cause said operating contact to move to the large end of said cam lobes as said pressure increases to predetermined amounts.

13. The combination according to claim 12 in which a thrust boss in said chamber engages said journal to determine the slow speed position when said spring overcomes the oil pressure in said chamber.

14. The combination according to claim 12 in which limiting means is provided for venting the oil pressure in said chamber when said journal moves to a selected point whereby said operating contact is prevented from moving to a higher speed position as oil pressure continues to increase with increased engine speed.

15. The combination according to claim 12 in which said limiting means is manually adjustable.

16. The combination according to claim 15 in which said limiting means includes a conduit leading from atmospheric pressure to said chamber, spaced ports leading from said chamber to said conduit, the inner ends of said ports being covered by said journal when in slow speed position, a plunger reciprocable in said conduit to selectively uncover the outer ends of said ports, and mechanism for reciprocating said plunger.

References Cited in the file of this patent

UNITED STATES PATENTS

| | | |
|---|---|---|
| 1,442,461 | Arnold | Jan. 16, 1923 |
| 2,191,459 | Duncan | Feb. 27, 1940 |